United States Patent [19]

Stephens

[11] 3,948,289
[45] Apr. 6, 1976

[54] FLOW REGULATORS
[75] Inventor: James B. Stephens, La Crescenta, Calif.
[73] Assignee: Westates Space-Era Products, Inc., South El Monte, Calif.
[22] Filed: June 20, 1974
[21] Appl. No.: 481,306

[52] U.S. Cl. .................. 138/37; 138/118; 138/177; 239/534; 137/498
[51] Int. Cl.² .......................................... F15D 1/02
[58] Field of Search ............. 138/37, 108, 118, 177, 138/178; 239/534, 542; 137/498; 251/145

[56] References Cited
UNITED STATES PATENTS
3,107,684   10/1963   Hix ..................................... 138/118

Primary Examiner—Richard E. Aegerter
Assistant Examiner—L. Footland
Attorney, Agent, or Firm—Edward D. O'Brian

[57] ABSTRACT

It is known to construct fluid dispensing structures which utilize tubes or conduits which expand or contract in cross-section in accordance with the internal pressure of a fluid within such a tube or conduit in combination with one or more flow control members mounted on such a tube or conduit. These devices are constructed so that there is relative motion between such a tube or conduit and such a flow control member as the tube or conduit changes in cross-sectional configuration. Structures of this type may be modified so that they are usable in providing a relatively constant discharge of a fluid regardless of changes in the fluid pressure within such a tube or conduit by utilizing a pressure compensating spring in combination with each flow control member used. The use of such springs makes flow regulators in accordance with the invention particularly desirable for use in dispensing water in agricultural watering or irrigation applications where there may be a variation in the internal pressure within a tube or conduit.

8 Claims, 2 Drawing Figures

U.S. Patent   April 6, 1976   3,948,289
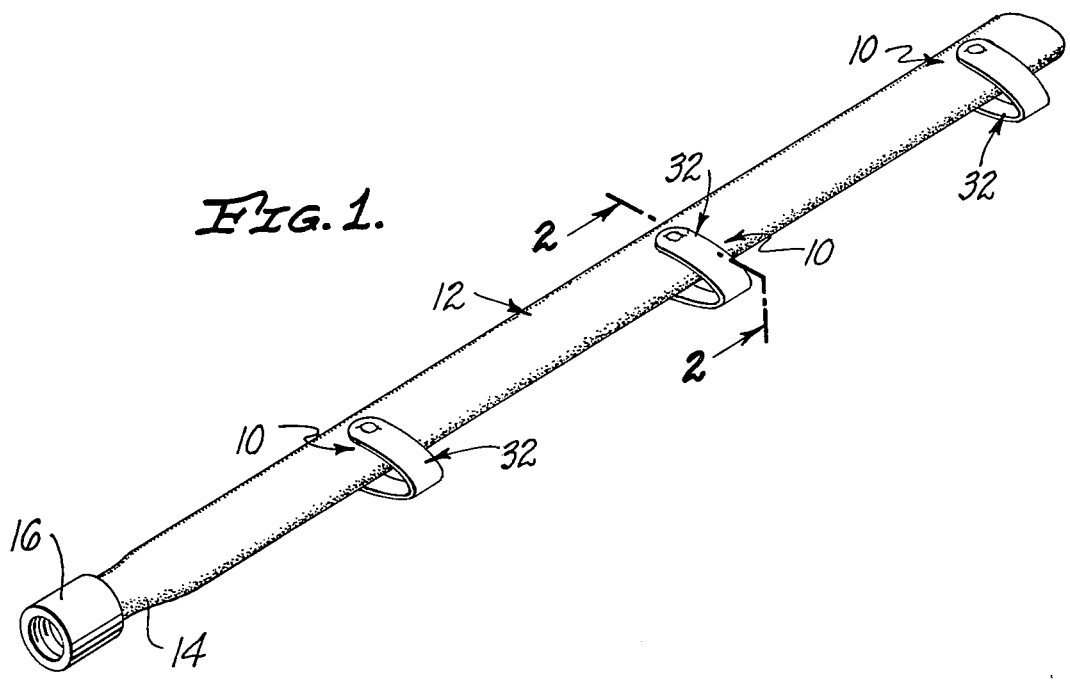
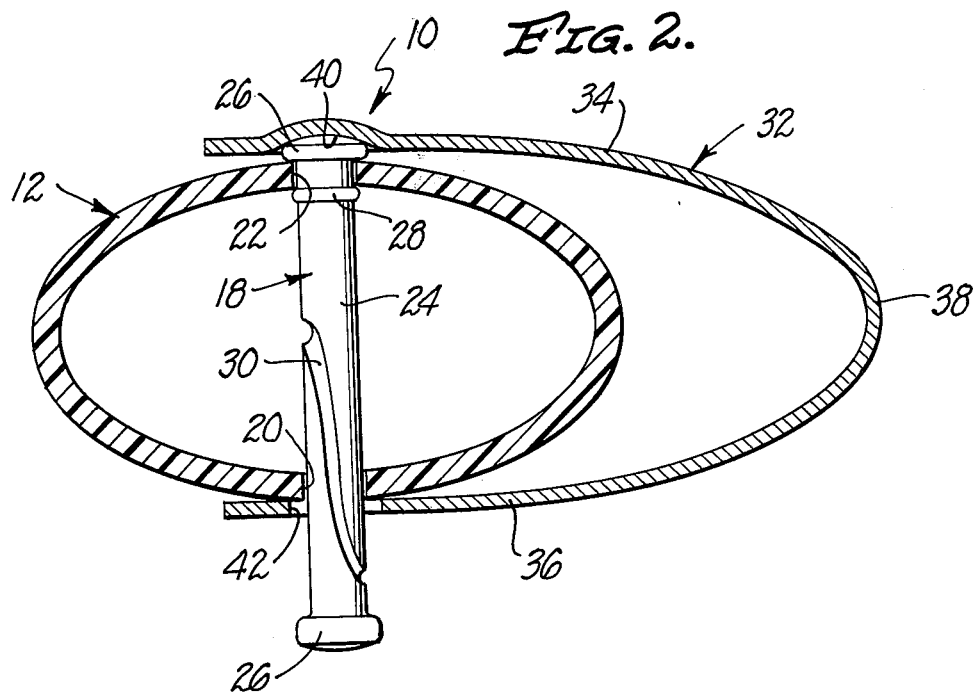

FLOW REGULATORS

CROSS-REFERENCE TO RELATED APPLICATIONS

This application relates to the copending, commonly owned U.S. patent application Ser. No. 492,488 filed July 29, 1974 entitled "Fluid Dispensing Structures."

BACKGROUND OF THE INVENTION

The invention set forth in this specification pertains to new and improved flow regulators. More specifically it pertains to flow regulators which are utilized to control the emission of a fluid under pressure from a tube or conduit.

Although the flow regulators of the invention are capable of being utilized for a wide variety of different purposes, they are primarily intended for use in agricultural watering or irrigation type applications. It will be recognized that many different "emitter" or "dripper" or similar structures have been developed and utilized for agricultural watering or irrigation type purposes.

Certain effective structures as are known for such utilization are constructed so as to utilize an elongated tube or conduit capable of expanding or contracting in cross-sectional configuration in accordance with the internal pressure of water within such a tube or conduit. In dispensing structures of this type such expansion and contraction is utilized to move a wall of a tube or conduit in such a manner that there is relative motion between a hole in such a wall and a flow control member mounted on the tube or conduit. Dispensing structures of this type normally utilize a series of such flow control members and associated holes located along the length of an elongated tube or conduit.

Although structures of this type are effective and utilitarian, they are not particularly desirable for use in certain types of applications. Dispensing structures as indicated in the preceding are in effect pressure actuated or pressure responsive. In other words, the amount of a fluid such as water which will be emitted from a dispensing structure as indicated in the preceding will vary in accordance with the pressure of the fluid within such a structure.

Because there will be a pressure drop in an elongated tube or conduit conveying water from one end of the tube or conduit to various different dispensing structures located along the length of such tube or conduit, the amount of water emitted at various dispensing structures as indicated along a tube or conduit will vary in accordance with the pressure at such a dispensing structure and this in turn will vary in accordance with the distance of such a dispensing structure from the end of the tube or conduit which receives liquid under pressure.

Also a dispensing structure as indicated in the preceding can be considered to be relatively disadvantageous for use on hillsides and the like where the tube or conduit may extend at different elevations. The pressure at a particular dispensing structure in such a tube or conduit extending at various elevations will vary depending upon the altitude or elevation of such a dispensing structure. As a consequence of this the amount of water distributed or emitted at various dispensing structures located at various different elevations along the length of the tube or conduit will vary depending upon the location of a dispensing structure.

BRIEF SUMMARY OF THE INVENTION

A broad objective of the present invention is to provide new and improved flow regulators which can be utilized at various points along the length of an elongated tube or conduit to emit controlled amounts of water or other fluids. More specifically, the invention is directed towards new and improved flow regulators which can be effectively utilized as indicated along tubes or conduits at various different elevations or altitudes. Other objectives of the present invention are to provide flow regulators as indicated which are relatively inexpensive, which may be easily and conveniently manufactured, and which are capable of being utilized for a prolonged period with a minimum of servicing and maintenance.

In accordance with this invention these objectives are achieved by providing a flow regulator constructed so as to utilize a flow regulator having a conduit which is capable of expanding and contracting in at least one cross-sectional dimension in accordance with the internal pressure of a fluid within the conduit, the conduit having a hole located therein which is moved relative to the remainder of the conduit during such expansion and contraction and having a flow control member mounted on the conduit so that during such expansion and contraction there is relative movement between the flow control member and the hole in which the improvement comprises: a spring means engaging the conduit so as to control the expansion and contraction of the conduit in accordance with the internal pressure of the fluid within the conduit.

BRIEF DESCRIPTION OF THE DRAWING

Any summary such as the preceding summary is limited in that it cannot effectively indicate all of the facets and features of an invention such as the invention set forth in this specification. Further details of the present invention as well as many specific advantages and features of it will be apparent from a careful consideration of the remainder of this specification, the appended claims, and the accompanying drawing in which:

FIG. 1 is an isometric view showing several flow regulators in accordance with this invention utilized along a length of a tube or conduit;

FIG. 2 is a cross-sectional view taken at lines 2—2 of FIG. 1.

The particular flow regulators shown in the drawing utilize certain intangible features or principles of the invention as are set forth and defined in the appended claims. These features can be utilized in a variety of somewhat differently appearing and somewhat differently constructed flow regulators.

DESCRIPTION OF THE PREFERRED EMBODIMENT

In FIG. 1 of the drawing several identically formed flow regulators 10 are illustrated in use upon and in combination with an elongated tube or conduit 12. It is to be understood that normally this conduit 12 will be extremely long in length and that an extremely large number of these flow regulators 10 will be utilized along its length so as to be spaced from one another a distance approximating the distance desired for a particular watering or water emitting application. An end 14 of the conduit 12 will normally be provided with a conventional coupling 16 for use in connecting the conduit 12 to a source of fluid under pressure (not shown).

The conduit 12 is preferably formed so as to have a uniform cross-sectional configuration by conventional extruding techniques. It is preferably formed out of a material such as polyethylene, a plasticized vinyl composition, or the like which is somewhat flexible and somewhat resilient in character so that this conduit 12 will normally tend to flatten out or collapse from its own weight when there is no fluid under pressure within its interior. The conduit 12, however, is of such a nature that it will be inflated or expanded in response to fluid under pressure being applied to its interior. Thus, the conduit 12 can be referred to as being capable of expanding or contracting in cross-sectional dimension as it is utilized.

In accordance with this invention such expansion and contraction is utilized to obtain relative movement between a flow control member 18 and an opening or hole 20 within each of the flow regulators 10. It will be recognized that the holes 20 in these regulators 10 are formed in the conduit 12 so as to lead to the interior of the conduit 12 to the exterior of the conduit 12. In the preferred structure in accordance with this invention each of the holes 20 is used with another corresponding hole 22 located diametrically across the interior of the conduit 12 from a hole 20.

The flow control members 18 are provided with enlarged heads 26 carried upon the shanks 24 which are of sufficient dimension so as to be incapable of passing through the holes 22. The shanks 24 are also provided with projecting flanges 28 spaced from the heads 26 a distance corresponding to the thickness of the conduit 12. These flanges 28 are, however, capable of being "popped" or fitted through the holes 22 as the result of temporary material deformation so as to secure the members 18 in place. When a flow control member 18 is in place the flange 28 and the head 26 on it serve to mount it in such a manner that expansion or contraction of the conduit 12 will only result in relative motion between a hole 20 and the shank 24.

Preferably each shank 24 is made so as to fit closely within a hole 20 so that there will be little or no leakage of fluid between the exterior of the shank 24 and the interior of the hole 20 as the conduit 12 expands and contracts. When the shank 24 is so formed any fluid distributed from the conduit 12 will pass through a groove 30 located in the shank 24. Preferably this groove 30 is of a helical shape and is of sufficient length so that during expansion and contraction of the conduit 12 the entire internal periphery of a hole 20 will pass along this groove 30. This provides a type of wiping action which is considered to be very effective in preventing clogging as the result of the accumulation of material such as algae or the like or inorganic solids. Preferably, this groove 30 varies in cross-sectional dimension as illustrated in a manner which is related to the construction of a spring element 32 used with each flow regulator 10.

Each spring element 32 includes arms 34 and 36 connected by a resilient center section 38 and has a generally C-type shape. In each element 32 the arm 34 is preferably provided with an outwardly extending dimple 40 which fits over a head 26 in order to maintain the spring element 32 in a given position with respect to a flow control member 18. Preferably also each arm 36 is provided with a hole 42 which fits around a shank 24 where this shank 24 extends from the conduit 12. This also aids in maintaining a spring element 32 in an operative position. The hole 42 is preferably sufficiently large in dimension so as not to bind up upon the shank 24 in such a manner as to interfere with the relative movement between the shank 24 and the hole 20 in the conduit 12.

The spring element 32 is employed in the flow regulator 10 in order to provide a uniform predetermined comparatively strong force tending to collapse the conduit 12 in the general vicinity of the flow control member 18. This spring element 32 preferably has a spring rate which is related to the cross-sectional configuration of the groove 30 in such a manner that the flow of fluid from within the interior of the conduit 12 through the groove 30 in any particular flow regulator 10 is controlled and is relatively independent of the fluid pressure within the tube 12 within the range of fluid pressures normally applied to the interior of the tube 12. With the particular structure shown the groove 30 is of a non-linear, cross-sectional configuration and gradually decreases in cross-sectional area as it progresses away from the head 26 in order to obtain this result.

It will be apparent from a careful consideration of the preceding that the flow regulators falling within the scope of the present invention are relatively inexpensive, easily and conveniently manufactured structures which are capable of being utilized for long periods with a minimum of servicing and maintenance. With a preferred structure as shown the normal expansion and contraction of the tube 12 will achieve an anti-clogging action which is considered to be quite desirable from a commercial standpoint. It is to be understood, however, that the invention is not limited to its use with flow control members exactly corresponding to the member 18. It is considered that broadly the invention is applicable to the use of any flow control member which is secured so that there is relative movement between the flow control member and a hole in a tube or conduit as the tube or conduit expands or contracts, or similarly changes in cross-sectional configuration.

While the various factors mentioned in the preceding paragraph are important and significant the invention possesses other significant advantages—more specifically, advantages pertaining to the utility of flow regulators as set forth herein connected to an elongated, common supply conduit or tube. Because of the construction of the flow regulators described these flow regulators can be utilized so as to obtain relatively constant fluid discharge at all points along the length of such a tube or conduit, even if the flow regulators are located at various different altitudes or elevations.

I claim:

1. A flow regulator structure having a flexible conduit which is capable of expanding and contracting in at least one cross-sectional dimension within the conduit, the conduit having a hole located therein which is moved relative to the remainder of the conduit during such expansion and contraction and having a flow control member mounted to the conduit and extending through said hole for controlling the flow, so that during such expansion and contraction there is relative movement between the flow control member and the hole in which the improvement comprises:

a spring means for controlling the expansion and contraction of the conduit adjacent to said hole and said flow control member in accordance with the internal pressure of the fluid within the conduit, said spring means engaging said flexible conduit adjacent to said hole and said flow control member.

2. A flow regulator structure having a conduit which is capable of expanding and contracting in at least one cross-sectional dimension in accordance with the internal pressure of a fluid within the conduit, the conduit having a hole located therein which is moved relative to the remainder of the conduit during such expansion and contraction and having a flow control member mounted to the conduit and extending through said hole for controlling the flow, so that during such expansion and contraction there is relative movement between the flow control member and the hole in which the improvement comprises:
- a spring means engaging said conduit so as to control the expansion and contraction of the conduit adjacent to said hole of said flow control member in accordance with the internal pressure of the fluid within the conduit,
- said flow control member having a shank which extends through said hole.

3. A flow regulator structure as claimed in claim 2 wherein:
- said shank fits closely within said hole and said conduit is capable of relative movement with respect to said shank during said expansion and contraction,
- said shank has a groove formed therein through which fluid can escape from the interior of said conduit.

4. A flow regulator structure as claimed in claim 3 wherein:
- said groove gradually decreases in cross-sectional area as it extends away from the interior of said conduit.

5. A flow regulator structure as claimed in claim 4 wherein:
- said groove extends helically around said shank.

6. A flow regulator structure having a conduit which is capable of expanding and contracting in at least one cross-sectional dimension in accordance with the internal pressure of a fluid within the conduit, the conduit having a hole located therein which is moved relative to the remainder of the conduit during such expansion and contraction and having a flow control member mounted to the conduit and extending through said hole for controlling the flow, so that during such expansion and contraction there is relative movement between the flow control member and the hole in which the improvement comprises:
- a spring means engaging said conduit so as to control the expansion and contraction of the conduit adjacent to said hole of said flow control member in accordance with the internal pressure of the fluid within the conduit,
- said spring means having a spring rate which is related to the manner in which said flow control member is constructed so that the flow of fluid from within the interior of said conduit is controlled and is relatively independent of fluid pressure within the interior of said conduit within the range of fluid pressures to be applied to the interior of said conduit during the use of said regulator.

7. A flow regulator structure having a conduit which is capable of expanding and contracting in at least one cross-sectional dimension in accordance with the internal pressure of a fluid within the conduit, the conduit having a hole located therein which is moved relative to the remainder of the conduit during such expansion and contraction and having a flow control member mounted to the conduit and extending through said hole for controlling the flow, so that during such expansion and contraction there is relative movement between the flow control member and the hole in which the improvement comprises:
- a spring means engaging said conduit so as to control the expansion and contraction of the conduit adjacent to said hole of said flow control member in accordance with the internal pressure of the fluid within the conduit,
- said spring means having a C-shape and having arms which engage diametrically opposed exterior surfaces of said conduit,
- said flow control member being mounted on said conduit and having a shank which extends through said hole,
- said arms of said spring means fitting around said conduit adjacent to said flow control member, one of said arms engaging said flow control member adjacent to where said control member is attached to said conduit, the other of said arms fitting around said shank and said opening.

8. A flow regulator structure as claimed in claim 7 wherein:
- said shank fits closely within said hole and said conduit is capable of relative movement with respect to said shank during said expansion and contraction,
- said shank has a groove formed therein through which fluid can escape from the interior of said conduit,
- said groove gradually decreases in cross-sectional area as it extends away from the interior of said conduit,
- said groove extends helically around said shank,
- said spring means has a spring rate which is related to the manner in which said flow control member is constructed so that the flow of fluid from within the interior of said conduit is controlled and is relatively independent of fluid pressure within the interior of said conduit within the range of fluid pressures to be applied to the interior of said conduit during the use of said regulator.

* * * * *